United States Patent
Christenson et al.

(10) Patent No.: US 7,283,829 B2
(45) Date of Patent: Oct. 16, 2007

(54) MANAGEMENT OF CALL REQUESTS IN MULTI-MODAL COMMUNICATION ENVIRONMENTS

(75) Inventors: Steven L. Christenson, Santa Clara City, CA (US); Shamim S. Pirzada, Santa Clara City, CA (US)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 11/089,733

(22) Filed: Mar. 25, 2005

(65) Prior Publication Data

US 2006/0217133 A1 Sep. 28, 2006

(51) Int. Cl.
  H04Q 7/22 (2006.01)
  H04Q 7/20 (2006.01)
  H04M 3/42 (2006.01)
  H04M 1/00 (2006.01)
  H04B 1/38 (2006.01)

(52) U.S. Cl. .................. 455/461; 455/412.2; 455/415; 455/417; 455/550.1; 455/556.2; 455/567

(58) Field of Classification Search .. 455/414.2–414.4, 455/412.1, 412.2, 41.2, 508–511, 516–517, 455/432.1–432.3, 434, 445, 450–451, 452.1, 455/452.2, 461–462, 466, 500, 550.1, 556.1, 455/556.2, 413, 557, 566–567, 456.1–456.6, 455/410–411, 415–417, 457–459, 414.3; 370/905, 297–298, 260–263; 709/203, 216, 709/221–222, 228–229, 226; 375/370
See application file for complete search history.

(56) References Cited

U.S. PATENT DOCUMENTS

| | | | | |
|---|---|---|---|---|
| 5,548,636 A | 8/1996 | Bannister et al. | ........... | 379/201 |
| 5,894,595 A | 4/1999 | Foladare et al. | ......... | 455/556.2 |
| 5,930,700 A | 7/1999 | Pepper et al. | ............. | 455/435.3 |
| 5,987,102 A | 11/1999 | Elliott et al. | ............. | 379/93.17 |
| 6,212,261 B1 * | 4/2001 | Meubus et al. | .......... | 379/88.12 |
| 6,301,609 B1 | 10/2001 | Aravamudan et al. | ...... | 709/207 |
| 6,496,691 B1 | 12/2002 | Easley et al. | ................ | 455/415 |
| 6,584,490 B1 | 6/2003 | Schuster et al. | ............ | 709/200 |
| 6,745,193 B1 * | 6/2004 | Horvitz et al. | .............. | 707/101 |
| 6,826,173 B1 * | 11/2004 | Kung et al. | ................. | 370/352 |
| 6,829,234 B1 | 12/2004 | Kaplan et al. | .............. | 370/352 |
| 7,020,259 B2 * | 3/2006 | Hussain et al. | ......... | 379/211.02 |
| 7,088,816 B2 * | 8/2006 | Donnelly | ............... | 379/373.01 |
| 2002/0077102 A1 * | 6/2002 | Achuthan et al. | ........... | 455/435 |
| 2002/0122401 A1 * | 9/2002 | Xiang et al. | ................ | 370/338 |
| 2003/0043974 A1 * | 3/2003 | Emerson, III | ............ | 379/88.13 |

(Continued)

Primary Examiner—Meless Zewdu
(74) Attorney, Agent, or Firm—Baker Botts L.L.P.

(57) ABSTRACT

A communication system for providing multi-modal call management includes a communication manager, a notification database, and a personal assistant. The communication system can receive a call, collect caller identification information, generate a call notification, and send the call notification to one or more communication devices through one or more communication protocols. The communication system can also receive a response to the call notification and initiate an action regarding the call based on the call notification response. The communications system can perform all of these activities while maintaining the call in an offering state. The call management system allows a system user to manage an outstanding call using one or more of multiple communication devices, identified by the communication manager as being associated with the system user.

14 Claims, 3 Drawing Sheets

U.S. PATENT DOCUMENTS

2003/0156690 A1* 8/2003 Crockett et al. ......... 379/93.23
2004/0029567 A1* 2/2004 Timmins et al. ......... 455/412.1
2005/0053221 A1* 3/2005 Reding et al. ......... 379/211.02
2006/0116114 A1* 6/2006 Kadado ...................... 455/415

* cited by examiner

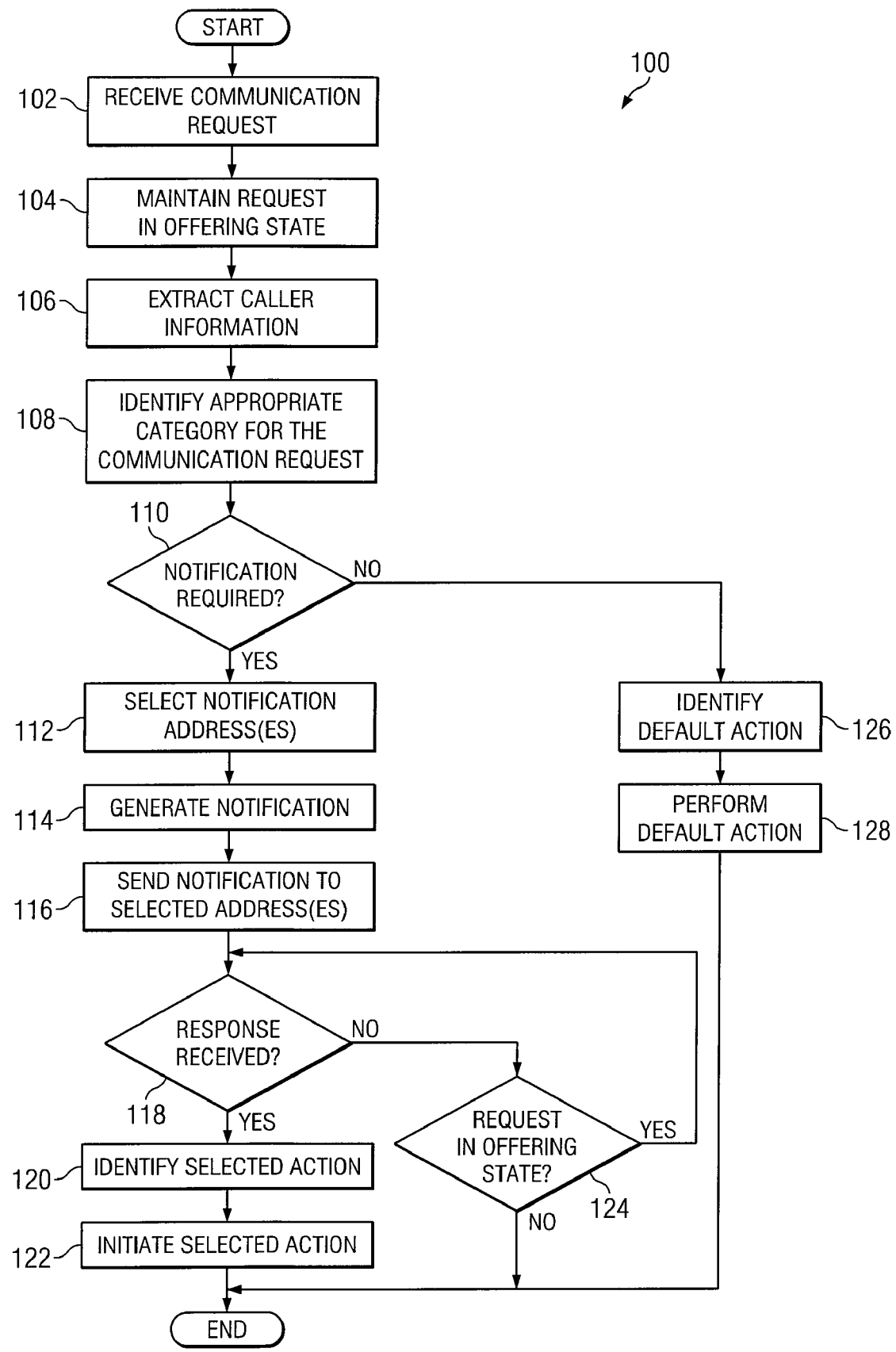

MANAGEMENT OF CALL REQUESTS IN MULTI-MODAL COMMUNICATION ENVIRONMENTS

TECHNICAL FIELD OF THE INVENTION

The present invention relates generally to telecommunications and, more particularly, to call management.

BACKGROUND OF THE INVENTION

Businesses and individuals have traditionally utilized call managers, privacy managers, and personal assistants to manage and forward telephone calls. However, with the advent of Internet technologies, cellular phones, and instant messaging, there are often multiple communication platforms through which persons can be contacted. In addition, as these many communication platforms continue to develop, there is an increasing dissatisfaction with the response delays necessarily involved with the use of voicemail. Despite the availability of numerous "instant" communication technologies, the delays inherent in voicemail remain common.

SUMMARY OF THE INVENTION

In accordance with the present invention, techniques for multi-modal call management are provided. According to some embodiments, these techniques can enable an individual to be notified regarding an outstanding call and can enable that individual to manage that call while the call remains in an offering state. Both the notification and management can be accomplished using one or more of numerous communication devices and protocols.

According to a particular embodiment, a system for providing multi-modal call management includes a communication manager operable to receive a communication request requesting a voice communication session with a target address, offer the voice communication session to an endpoint device, and maintain the communication request in an offering state. The system also includes a notification database comprising a plurality of user profiles each comprising an enterprise address and one or more notification addresses each having an associated communication protocol. The system further includes a personal assistant operable to detect the offered voice communication session, extract caller information from the offered voice communication session, access the notification addresses in the notification database, send a communication request notification to one or more of the notification addresses in the notification database while the communication request is maintained in an offering state, receive a response to the communication request notification while the communication request is maintained in an offering state, and initiate a selected action for the communication request based upon the response to the communication request notification while the communication request is maintained in an offering state.

Embodiments of the invention provide various technical advantages. For example, these techniques may allow a user to actively manage an outstanding call from a remote location. According to some embodiments, these techniques may allow a user to choose whether to answer an outstanding call, which was initially directed to a desktop telephone number, using a remote cellular phone in conjunction with text messaging, voice commands, and/or keypad entries. Furthermore, these techniques may enable a system user to receive a notification of an outstanding telephone call through one or more of multiple communication platforms including electronic mail, instant messaging, two-way paging, automated voice messaging, etc.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 is a flowchart illustrating a method for managing an outstanding call using a multi-modal notification.

DETAILED DESCRIPTION OF THE DRAWINGS

Figure 1:
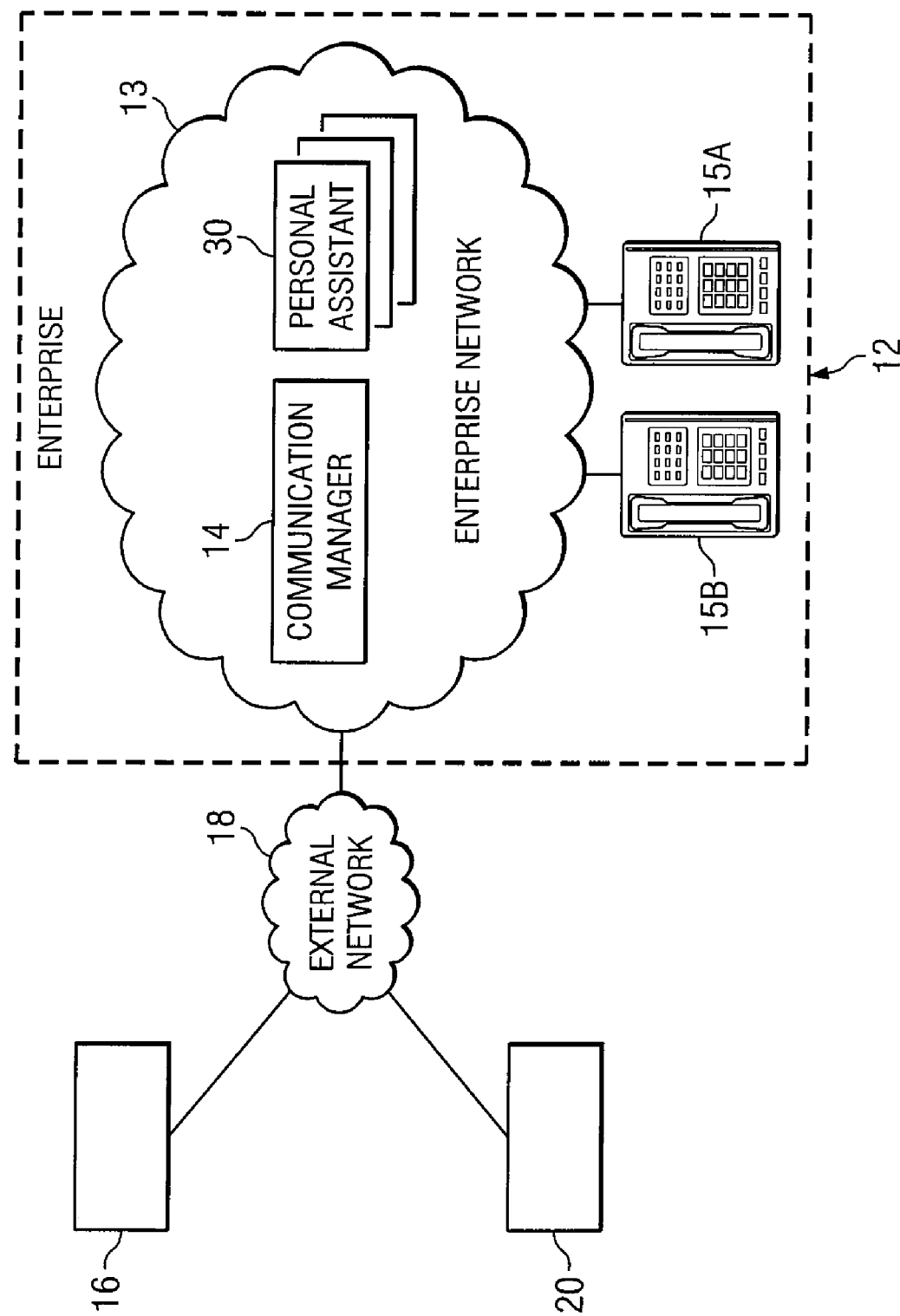
FIG. 1 illustrates a communication system having elements that support multi-modal call management.

FIG. 1 illustrates a communication system, indicated generally at 10, that includes enterprise 12, caller 16, external network 18, and communication target 20. Enterprise 12 may include enterprise network 13, communication manager 14, desktop telephone 15, and personal assistant 30. The elements of enterprise 12 can enable communication target 20 to receive a notification regarding an outstanding call initiated by caller 16 and to coordinate the substantially real-time management of the outstanding call. This substantially real-time call management may be performed by communication target 20 through the use of one or more of multiple communications platforms, such as electronic mail, instant messaging, two-way paging, and automated voice messaging.

Enterprise network 13 represents communication equipment, including hardware and any appropriate controlling logic, for interconnecting elements coupled to enterprise network 13. Thus, enterprise network 13 may represent a local area network (LAN), a wide area network (WAN), and/or any other appropriate form of network. Furthermore, elements within enterprise network 13 may utilize circuit-switched and/or packet-based communication protocols to provide for telephony services. For example, elements within enterprise network 13 may utilize Internet protocol. In addition, elements within enterprise network 13 may utilize wireless standards, such as the 802.11 family of wireless standards, to provide for wireless telephony services. Enterprise network 13 may also utilize interactive voice response (IVR). Enterprise network 13 may include any number of communication managers 14, personal assistants 30, and other appropriate communication equipment for use in communicating with desktop telephone 15 and external network 18. As illustrated, enterprise network 13 couples to desktop telephone 15, caller 16, and communication target 20 to help support multi-modal call management.

In the embodiment illustrated, communication manager 14 and personal assistant 30 are included within enterprise network 13. Communication manager 14 represents communication equipment, including hardware and any appropriate controlling logic, for providing telephony services over enterprise network 13. For example, communication manager 14 may support voice over IP (VOIP) communications using any of various protocols such as signaling connection control point (SCCP) protocol, session initiation protocol (SIP), media gateway control protocol (MGCP), H.323, and/or any other appropriate protocol for VOIP. Furthermore, communication manager 14 may act as an IP private branch exchange (PBX) and support PBX functions, such as hold, park, transfer, redirect, and/or other high level and low level call management features. Personal assistant 30 represents any suitable collection of hardware, software, and controlling logic to support multi-modal call management. Personal assistant 30 supports real-time call management of incoming calls using one or more communication channels to interact with system users. For example, personal assistant 30 may use instant messaging communications with a system user to enable substantially real-time call management of an incoming call offered to an enterprise telephone. Further description of personal assistant 30 is included below in relation to FIG. 3.

Desktop telephone 15 represents a communication device, including hardware and any appropriate controlling logic, capable of communicating with remote devices through enterprise network 13. Desktop telephone 15 may be identified or indexed by physical connection, routing address, hardware serial number, or by association with a system user or location. Desktop telephone 15 may connect to enterprise network 13 through wireline or wireless connection technologies. In addition, desktop telephone 15 may contain some, none, or all of the functionality of communication manager 14 and/or personal assistant 30. Although desktop telephone 15 is typically identified as being utilized as an office phone, desktop telephone 15 may be a home phone, car phone, cellular phone, or any other communication device capable of communicating with remote devices through enterprise network 13.

External network 18 represents communication equipment, including hardware and any appropriate controlling logic, for interconnecting elements coupled to external network 18. External network 18 may include switches, routers, gateways, wireline and wireless communication devices, and any other appropriate equipment for interconnecting external network 18 and enterprise network 13. For example, external network 18 may include portions of public and private networks, such as the public switched telephone network (PSTN) and the Internet. Although not explicitly shown, caller 16 and/or communication target 20 may couple directly to enterprise network 13, without using external network 18.

In operation, caller 16 may initiate a communication request directed to a desktop telephone 15 associated with communication target 20. The communication request may be transmitted to enterprise network 13 and managed by communication manager 14. Communication manager 14 may identify the appropriate desktop telephone 15, offer a voice communication session to the identified desktop telephone 15, and maintain the communication request in an offering state. As used herein, an offering state is any condition in which signaling for a communication session has been received, but the media connection has not yet been established. The offered communication session may, for example, cause desktop telephone 15 to ring or otherwise indicate that a communication session is being offered. In one embodiment, the communication request may be directed to an IVR system, a voice mail system, or some other automated answering system.

Through coordination with communication manager 14, desktop telephone 15, or other appropriate devices, personal assistant 30 may detect the offered voice communication session. Additionally, personal assistant 30 may extract information about caller 16 from the offered voice communication session. While the call remains in an offering state, personal assistant 30 generates and sends a notification to one or more communication targets 20 associated with desktop telephone 15. The notification may be generated based on stored notification logic and may contain information regarding both the offered voice communication and caller 16. The notification identifies the existence of an outstanding communication request within enterprise network 13 and provides an opportunity for communication target 20 to respond. For example, the notification may identify caller 16 and may provide one or more options for responding to the notification. Further description of the communication request notification is included below in relation to FIG. 4.

Communication target 20 receives, processes, and responds to communication request notifications sent by personal assistant 30. The response includes information identifying a desired action to be taken with respect to the offered communication request. The response may be sent to personal assistant 30 using the same or a different communication protocol as the communication request notification and may identify a desired action for the offered communication request. Further descriptions of communication target 20 and responses to communication request notifications are included below in relation to FIG. 2.

If personal assistant 30 receives a response back from communication target 20 while the communication request remains in an offered state, then personal assistant 30 will determine the action identified in the response and initiate that action for the offered communications request. The identified action may entail one or more of the following: transferring the communication request to communication target 20, rejecting the communication request, transferring the communication request to a voicemail interchange, placing the communication request in an on-hold status, forwarding the call to an identified address, transmitting a stored message to caller 16, transmitting a custom message included in the notification response to caller 16, placing the extracted information about caller 16 in a blocked caller list, maintaining the communication request in an offering state, etc.

Note that communication system 10 illustrates one embodiment of a system that supports multi-modal call management. Various alternative embodiments are possible. For example, while illustrated with enterprise network 13 coupled to communication target 20 through external network 18, communication target 20 may couple directly to enterprise network 13, or reside within enterprise network 13. Additionally, while in the illustrated embodiment enterprise network 13 couples to caller 16 and communication target 20 through a single external network 18, enterprise network 13 may couple to caller 16 and communication target 20 using one, two, many, or no external networks 18.

Figure 2:
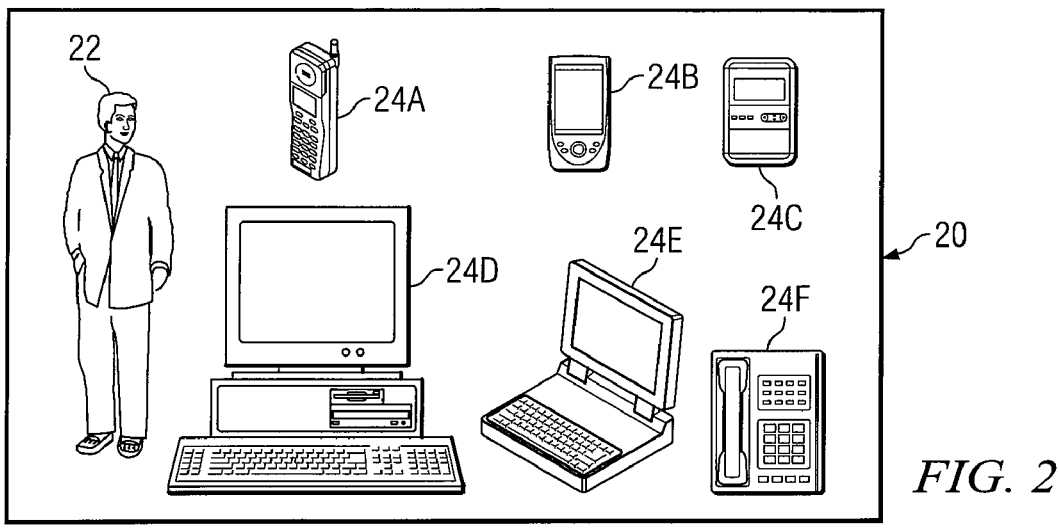
FIG. 2 illustrates a communication target that includes a number of associated communication devices.

FIG. 2 illustrates a communication target 20 that includes a number of associated communication devices 24. Communication target 20 represents the target of the call request initiated by caller 16. As illustrated, communication target 20 includes system user 22 and one or more communication devices 24. System user 22 may be an individual, a group of individuals, a department, or any other entity which can effectively respond to a call request notification. Each communication device 24 represents a device capable of receiving and/or sending substantially real-time electronic communications. For example, communication devices 24 may include cellular telephones, wireline telephones, personal digital assistants (PDA), desktop computers, laptop computers, two-way pagers, television set-top boxes, or any other devices operable to receive communication request notifications and transmit substantially real-time notification responses. Each communication device 24 connects to external network 18 or to enterprise network 13 through one or more appropriate wireless or wireline protocols. For example, communication device 24 may connect using one or more mobile communication technologies, such as global systems for mobile communications (GSM) and/or code division multiple access (CDMA). Furthermore, communication devices 24 may support packet-based protocols such as Internet protocol (IP) and wireless standards, such as the 802.11 family of wireless standards.

In operation, communication target 20 receives, processes, and responds to communication request notifications generated by personal assistant 30. Communication device 24 may receive a communication request notification according to the particular protocol used to transmit the notification. As an example, system user 22 may review the notification and generate a response indicating a desired action for personal assistant 30 to take regarding the outstanding call. The response may be sent back to personal assistant 30 using the same external network 18 and using the same communication protocol through which the notification was received. The response may also be sent to the personal assistant 30 using a different communication protocol, using a different communication device 24, and/or using a different external network 18. Upon receiving the response, personal assistant 30 identifies the desired action indicated in the response and initiates the selected action for the outstanding communication request.

According to a particular embodiment, communication target 20 receives a communication request notification on a cellular phone, in the form of an automated voice messaging system, and then responds to the communication request notification using dual-tone multi-frequency (DTMF) signaling. In another embodiment, communication target 20 receives a communication request notification in the form of an instant text-message and then responds to the communication request notification in kind, using an instant text-message. In yet another embodiment, communication target 20 receives a communication request notification over a cable network on a television set-top box and then responds on a separate cable channel or through an alternative back-channel network. In certain embodiments, the response may require a very low bit-rate transmission to communicate the selected action.

Note that the communication request notification may be communicated to communication target 20 through the use of specialized application software. Such software operating on any selected communication device 24 may serve to facilitate the display of communication notifications in the form of pop-up windows, graphical displays, icons, etc. Such software may also operate to provide certain elements of notification logic or other aspects of personal assistant 30. For example, personal assistant 30 may send a communication request notification every time that a voice communication session is detected, and the software operating on communication device 24 may determine whether to display the notification or to send a default response to personal assistant 30. Such determination may be made based upon user preferences, caller information, the time of day, the day of the week, etc.

Figure 3:
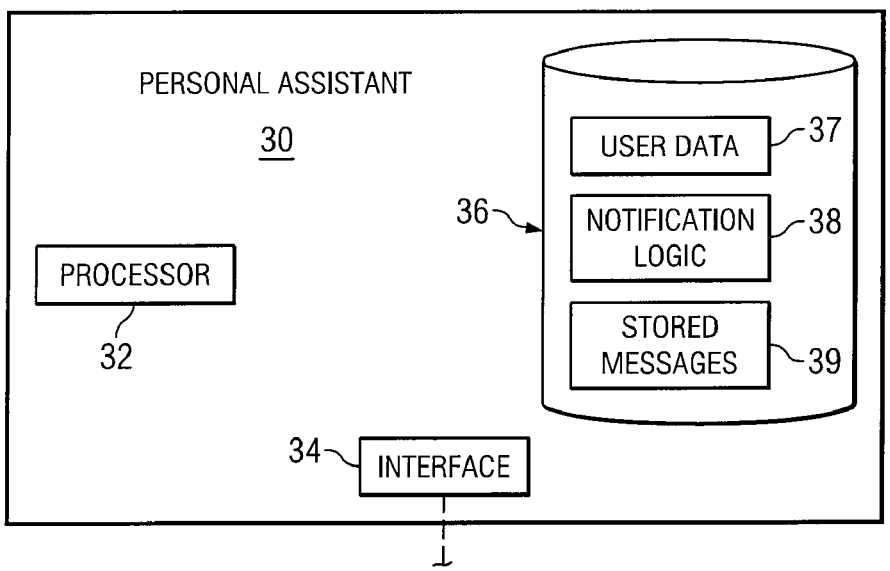
FIG. 3 is a block diagram illustrating functional components of a personal assistant from the communication system.

FIG. 3 is a block diagram illustrating functional components of personal assistant 30 from communication system 10. In the embodiment illustrated, personal assistant 30 includes processor 32, network interface 34, and memory 36. These functional components can operate to support multi-modal call management by generating and transmitting communication request notifications and by processing notification responses.

Processor 32 controls the operation and administration of elements within personal assistant 30 by processing information received from network interface 34 and memory 36. Processor 32 includes any hardware and/or logic elements operable to control and process information. For example, processor 32 may be a programmable logic device, a microcontroller, and/or any other suitable processing device.

Network interface 34 communicates information to and receives information from devices coupled to enterprise network 13. For example, network interface 34 may communicate with communication manager 14 and desktop telephone 15. Thus, network interface 34 includes any suitable hardware and/or controlling logic used to communicate information to or from elements coupled to personal assistant 30.

Memory 36 stores, either permanently or temporarily, data and other information for processing by processor 32 and communication using network interface 34. Memory 36 includes any one or a combination of volatile or nonvolatile local or remote devices suitable for storing information. For example, memory 36 may include random access memory (RAM), read only memory (ROM), magnetic storage devices, optical storage devices, or any other suitable information storage device or a combination of these devices.

Memory 36 may store, among other things, user data 37, notification logic 38, and stored messages 39. User data 37 may include, for each system user, addresses and protocols for each associated communication device 24, personal contact list information, notification rules and/or preferences, access codes, and a personal voice library. The addresses in user data 37 may include IP addresses, telephone numbers, SIP identifiers, port numbers, and any other appropriate information needed to send notifications to communication devices 24 associated with system user 22. Notification logic 38 includes code, executable files, and/or appropriate software modules capable, when executed, to control the operation of personal assistant 30 as it relates to multi-modal call management. Notification logic 38 includes logic necessary to identify communication request categories and to determine whether a communication request notification should be generated and sent. Notification logic 38 further includes the logic necessary to generate and transmit communication request notifications to multiple communication devices 24. Notification logic 38 may also contain the logic necessary to determine which communication devices to send notifications to, and in what order those notifications should be sent. Additionally, notification logic 38 may contain the logic necessary to interpret responses to communication request notifications and to initiate selected actions based on those responses. Stored messages 39 include messages recorded by a system user for later transmission to caller 16 and may also include standard messages provided by a system administrator or developer.

In operation, personal assistant 30 detects an offered communication request, categorizes the communication request, and determines whether a communication request notification should be sent. The categorization of communication requests may be based upon the time that the request is sent or received, the date of the communication request, the caller identification information, or some other information available to personal assistant 30 at the time that the communication request is received. In one embodiment, if caller identification information is not available, personal assistant 30 provides an opportunity for caller 16 to announce their name or to enter an access code using DTMF signaling. The determination as to whether a notification is required may be based upon default rules, rules established by system user 22, or rules established by a system administrator or other party. According to certain embodiments, such rules may be overridden by caller 16 entering an established code, using voice recognition, or interacting with some other identification technology. If personal assistant 30 determines that a notification should be sent, it will then determine how many notifications to send, the content of those notifications, the target addresses for those notifications, and the appropriate communication protocol for each of the notifications. The target addresses and appropriate communication protocols may be based on the information contained in user data 37. Personal assistant 30 will then generate the notifications and send them to the identified target addresses associated with communication target 20. If personal assistant 30 determines that a notification should not be sent, it will initiate one or more default actions based, in certain embodiments, on the identified category of the communication request. In one embodiment, if personal assistant 30 determines that a communication request notification is not required, it will direct the call to other appropriate services, such as to voicemail.

If after sending a communication request notification, personal assistant 30 receives a communication request notification response while the communication request is still in an offering state, personal assistant 30 will identify the selected action from the response and initiate that action for the communication request.

Note that personal assistant 30 may utilize any appropriate protocol to communicate with other elements of system 10. For example, personal assistant 30 may utilize Java telephony application programming interface (JTAPI) to interact with communication manager 14.

While this description includes specific functional components of personal assistant 30, personal assistant 30 may include any collection and arrangement of components, including some or all of the enumerated functional components, for providing multi-modal call management. Moreover, personal assistant 30 contemplates implementing each of the functional components using any suitable combination and arrangement of hardware and/or logic, and implementing any of the functionalities using a computer program stored on a computer readable medium. Furthermore, personal assistant 30 may be implemented as a stand-alone device, or aspects of personal assistant 30 may be distributed among various devices within enterprise network 13. For example, some or all aspects of personal assistant 30 may be incorporated into communication manager 14, or into an application running on a PC, server, or wireless device. In one embodiment, some or all aspects of personal assistant 30 may be incorporated into desktop telephone 15.

Figure 4:
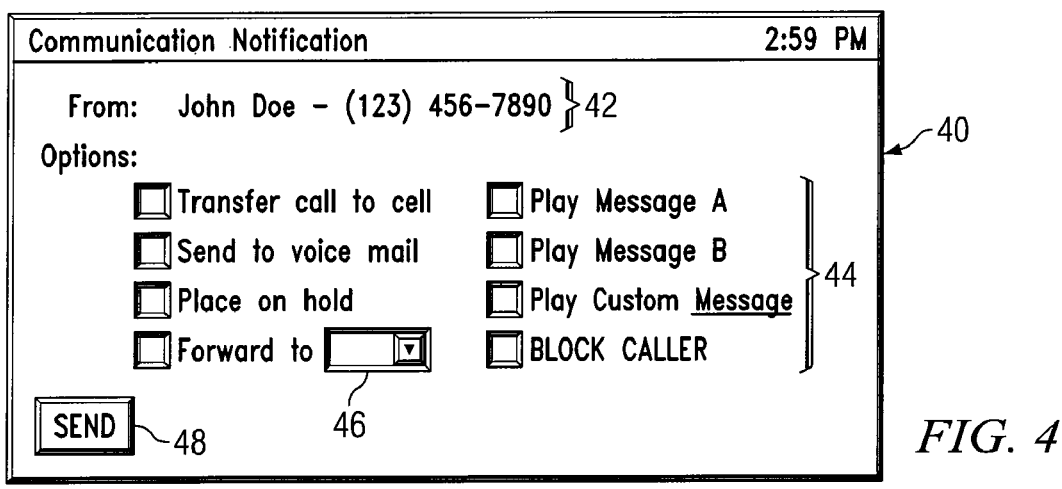
FIG. 4 illustrates a graphical display for a communication request notification.

FIG. 4 illustrates a graphical display 40 for a communication request notification. As illustrated, graphical display 40 includes caller information 42, response options 44, response customization fields 46, and transmit control 48 for sending the response. In operation, system user 22 receives a communication notification through one of the available communication devices 24. Caller information 42 may include the name of caller 16, the telephone number of caller 16, whether caller 16 is calling from inside enterprise network 13, and/or any other information available to personal assistant 30 that may be helpful to communication target 20 in processing the communication notification and/or in generating a notification response. As shown, response options 44 may include transferring the call, sending the call to voicemail, placing the call on hold, forwarding the call to a specified address, playing a stored message to caller 16, playing a custom message to caller 16, or blocking the call.

In one embodiment, upon receiving an election to transfer the call, personal assistant 30 may direct communication manager 14 to hairpin the communication request to communication target 20. In another embodiment, upon receiving an election to transfer the call, if the communication request is in the form of a SIP invite, then personal assistant 30 may initiate a reinvite and direct the SIP invite to communication target 20 without requiring the use of any enterprise resources to support the transfer.

In certain embodiments, response options 44 allow the system user to interact with the communication notification using a response customization field 46 to identify a specific address or communication device 24 for the communication request to be transferred. In another embodiment, the call will be transferred to the communication device 24 from which the notification response was sent. In yet another embodiment, response options 44 include blocking caller 16 from further communication requests by placing the caller identification information from the communication request into a personal, departmental, or enterprise-wide blocked-caller list.

In addition to the response options 44 shown, response options 44 may also include letting the call continue to ring or any other appropriate action convenient or appropriate for a communication request maintained in an offering state. As noted above, in certain embodiments, the communication request may be directed to an interactive voice response system, a voice mail system, or some other automated answering system. In these embodiments, response options 44 may include allowing the call to remain connected to an interactive voice response system, a voice mail system or some other automated answering system.

Response customization field 46 may be a form-field, drop down menu, text-box, radio-button, or any other input control capable of allowing system user 22 to customize the notification response. In one embodiment, response customization field 46 allows system user 22 to dictate a custom message that may be sent to caller 16 or allows system user 22 to type a custom message which could then be converted to an audible message and sent to caller 16. To convert the text message to an audible message, personal assistant 30 may utilize a default utility to create a generic voice message, or personal assistant 30 may utilize a stored voice library associated with system user 22 to create a user-specific voice message.

Transmit control 48 may be a simple control button, such as the SEND button shown in FIG. 4, or any other control capable of allowing system user 22 to initiate the transmittal of the notification response back to personal assistant 30. In operation, transmit control 48 may be activated by a mouse click, hotkey, keyboard command, touch screen, PDA stylus, voice command, or by any other appropriate interactive input technique or device.

Although the communication request notification is shown in FIG. 4 as being communicated in graphical display 40, communication request notifications may be communicated in text-only format, as an audio message such as an automated voice message, or in any other format which would enable system user 22 to receive the information needed to formulate a notification response. Furthermore, the notification response may be sent to personal assistant 30 using a different communication device 24 and/or a different communication protocol than the device or protocol with which the notification was received.

FIG. 5 is a flowchart illustrating method 100 for managing an outstanding call using multi-modal notification. Communication manager 14 receives a communication request from caller 16, requesting a voice communication session, at step 102. Communication manager 14 then maintains the communication request in an offering state, at step 104. Personal assistant 30 extracts caller information from the communication request, at step 106. Personal assistant 30 categorizes the communication request, at step 108. Personal assistant 30 determines, at step 110, whether a communication request notification is required. If a communication request notification is required, personal assistant 30 selects one or more notification addresses, at step 112. A communication request notification is generated by personal assistant 30, at step 114; and personal assistant 30 sends the communication request notification to the selected addresses, at step 116. Personal assistant 30 determines whether a response has been received, at step 118. If a response is received, personal assistant 30 identifies the selected action from the response, at step 120, and initiates the selected action, at step 122.

If a response has not been received at step 118, then personal assistant 30 determines whether the communication request remains in an offering state, at step 124. If the communication request remains in an offering state, then step 118 is repeated. If a notification is not required, at step 110, personal assistant 30 identifies a default action, at step 126; and personal assistant 30 initiates that default action, at step 128.

Thus method 100 represents a simplified series of steps to provide multi-modal call management. Method 100 illustrates an example of one method of operation, and system 10 contemplates devices using suitable techniques, elements, and applications for performing this method of operation. Many of the steps in the flowchart may take place simultaneously and/or in a different order than shown. In addition, the devices may use any methods with additional or fewer steps to achieve multi-modal call management, so long as the methods remain appropriate. Moreover, other devices of system 10 may perform similar techniques to support multi-modal call management.

Although the present invention has been described in several embodiments, a myriad of changes and modifications may be suggested to one skilled in the art, and it is intended that the present invention encompass such changes and modifications as fall within the present appended claims.

What is claimed is:

1. A system for managing a communication request comprising:
   a communication manager operable to: receive a communication request, requesting a voice communication session with a target address; determine an endpoint device associated with the target address; offer the voice communication session to the endpoint device; and maintain the communication request in an offering state;
   a notification database comprising: a plurality of user profiles each comprising an enterprise address; one or more notification addresses each having an associated communication protocol; and notification preferences;
   a personal assistant operable to: detect the offered voice communication session; extract caller information from the offered voice communication session; identify one or more of a time and a date; determine if a communication request notification is required for the communication request, based on one or more of the caller information, the time, and the date;
   if a communication request notification is not required:
      determine a default action for the communication request, while the communication request is maintained in an offering state; and
      initiate the default action for the communication request, while the communication request is maintained in an offering state; and
   if a communication request notification is required:
      access the notification addresses in the notification database; identify one or more notification addresses, associated with the target address, from the notification addresses in the notification database;
      generate the communication request notification, the communication request notification comprising a portion of the caller information and one or more response options, wherein the response options comprise one or more potential actions for the personal assistant to initiate for the communication request;
      send the communication request notification to one or more notification addresses, associated with the target address, from the notification addresses in the notification database using an asynchronous text-based communication protocol, while the communication request is maintained in an offering state;
      receive an asynchronous response to the communication request notification while the communication request is maintained in an offering state;
      determine a selected action for the communication request, based upon the asynchronous response to the communication request notification, while the communication request is maintained in an offering state, wherein the selected action for the communication request is placing the caller information in a blocked caller table and terminating the communication request; and
      initiate the selected action for the communication request, based upon the asynchronous response to the communication request notification, while the communication request is maintained in an offering state, wherein the selected action for the communication request is placing the caller information in a personal blocked caller table and terminating the communication request.

2. A system for managing a communication request comprising:
   a communication manager operable to: receive a communication request, requesting a voice communication session with a target address; offer the voice communication session to an endpoint device associated with the target address; and maintain the communication request in an offering state;
   a notification database comprising: a plurality of user profiles each comprising an enterprise address; and one or more notification addresses each having an associated communication protocol; and a personal assistant operable to: detect the offered voice communication session; extract caller information from the offered voice communication session; access the notification database to identify a user profile having an enterprise address corresponding to the target address; send a communication request notification to one or more of the notification addresses in the identified user profile while the communication request is maintained in an offering state; receive a response to the communication request notification while the communication request is maintained in an offering state; and initiate a selected action for the communication request, based upon the response to the communication request notification, while the communication request is maintained in an offering state, wherein the communication request notification comprises a portion of the caller information and one or more response options, the one or more response options comprising one or more potential actions for the personal assistant to initiate for the communication request wherein the one or more response options include one or more of: establish the voice communication session and initiate a voicemail exchange; continue to maintain the communication response in an offering state; play a stored message and place the voice communication session on hold; play a customized message; forward the voice communication session to a remote communication device; and place the caller information in a personal blocked caller table and terminate the communication request.

3. The system of claim 2, wherein the communication request notification is sent using an asynchronous text-based communication protocol.

4. The system of claim 2, wherein the selected action for the communication request is using a local device to hairpin the voice communication session to a remote communication device.

5. The system of claim 2, wherein selected action initiated by the personal assistant is to convert a customized text message, contained in the response to the communication request notification, into a customized voice message, to establish the voice communication session, and to play the customized voice message.

6. A method for managing a communication request comprising:
   receiving a communication request, requesting a voice communication session with a target address;
   determining an endpoint device associated with the target address;
   offering a voice communication session to the endpoint device associated with the target address;
   maintaining the communication request in an offering state;
   extracting caller information from the communication request;
   while the communication request is maintained in an offering state, selecting a notification address based on the target address, the selected notification address having an associated communication protocol;
   while the communication request is maintained in an offering state, sending a communication request notification to the selected notification address, wherein the communication request notification comprises a portion of the caller information and one or more response options, the one or more response options comprising one or more potential actions to initiate for the communication request wherein the one or more response options include one or more of: establish the voice communication session and initiate a voicemail exchange; continue to maintain the communication response in an offering state; play a stored message and place the voice communication session on hold; play a customized message; forward the voice communication session to a remote communication device; and place the caller information in a personal blocked caller table and terminate the communication request;
   while the communication request is maintained in an offering state, receiving a response to the communication request notification; and
   while the communication request is maintained in an offering state, initiating a selected action for the communication request, based upon the response to the communication request notification.

7. The method of claim 6, wherein the communication request notification is sent using an asynchronous text-based communication protocol.

8. The method of claim 6, wherein the selected action for the communication request is using a local device to hairpin the voice communication session to a remote communication device.

9. The method of claim 6, wherein the selected action for the communication request is to convert a customized text message, contained in the response to the communication request notification, into a customized voice message, to establish the voice communication session, and to play the customized voice message.

10. Logic for managing a communication request, the logic encoded in computer-readable media and, when executed using one or more processors, operable to:
   receive a communication request, requesting a voice communication session with a target address;
   determine an endpoint device associated with the target address;
   offer a voice communication session to the endpoint device associated with the target address;
   maintain the communication request in an offering state;
   extract caller information from the communication request;
   while the communication request is maintained in an offering state, select a notification address based on the target address, the selected notification address having an associated communication protocol;
   while the communication request is maintained in an offering state, send a communication request notification to the selected notification address, wherein the communication request notification comprises a portion of the caller information and one or more response options, the one or more response options comprising one or more potential actions to initiate for the communication request wherein the one or more response options include one or more of: establish the voice communication session and initiate a voicemail exchange; continue to maintain the communication response in an offering state; play a stored message and place the voice communication session on hold; play a customized message; forward the voice communication session to a remote communication device; and place the caller information in a personal blocked caller table and terminate the communication request;
   while the communication request is maintained in an offering state, receive a response to the communication request notification; and
   while the communication request is maintained in an offering state, initiate a selected action for the communication request, based upon the response to the communication request notification.

11. The logic of claim 10, wherein the communication request notification is sent using an asynchronous text-based communication protocol.

12. The logic of claim 10, wherein the selected action for the communication request is using a local device to hairpin the voice communication session to a remote communication device.

13. The logic of claim 10, wherein the selected action for the communication request is to convert a customized text message, contained in the response to the communication request notification, into a customized voice message, to establish the voice communication session, and to play the customized voice message.

14. A system for managing an outstanding call comprising:
- a means for receiving a communication request, requesting a voice communication session with a target address;
- a means for determining an endpoint device associated with the target address;
- offering a voice communication session to the endpoint device associated with the target address;
- a means for maintaining the communication request in an offering state;
- a means for extracting caller information from the communication request;
- a means of selecting a notification address based on the target address, the selected notification address having an associated communication protocol, while the communication request is maintained in an offering state;
- a means for sending a communication request notification to the selected notification address, while the communication request is maintained in an offering state, wherein the communication request notification comprises a portion of the caller information and one or more response options, the one or more response options comprising one or more potential actions to initiate for the communication request wherein the one or more response options include one or more of: establish the voice communication session and initiate a voicemail exchange; continue to maintain the communication response in an offering state; play a stored message and place the voice communication session on hold; play a customized message; forward the voice communication session to a remote communication device; and place the caller information in a personal blocked caller table and terminate the communication request;
- a means for receiving a response to the communication request notification, while the communication request is maintained in an offering state; and
- a means for initiating a selected action for the communication request, based upon the response to the communication request notification, while the communication request is maintained in an offering state.

* * * * *